C. A. ELIGH.
METHOD OF MAKING HEAT RADIATING FINS.
APPLICATION FILED AUG. 13, 1915.

1,257,201.

Patented Feb. 19, 1918.
3 SHEETS—SHEET 1.

Witness
Nettie Sides
Joseph A. Wortman.

Inventor
Charles A. Eligh,
By
Kerr, Page, Cooper & Hayward,
Attorneys

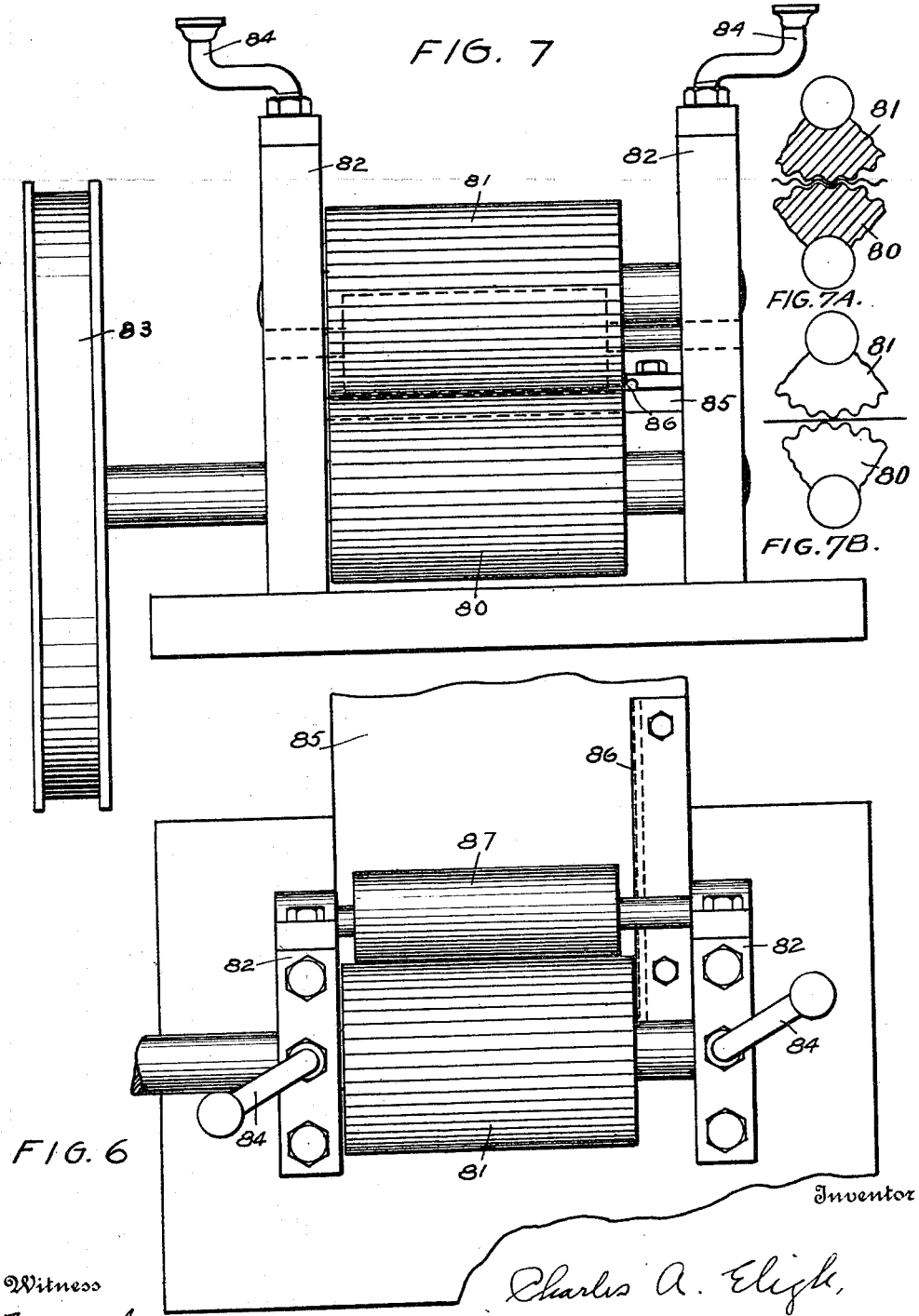

C. A. ELIGH.
METHOD OF MAKING HEAT RADIATING FINS.
APPLICATION FILED AUG. 13, 1915.
1,257,201. Patented Feb. 19, 1918.
3 SHEETS—SHEET 3.
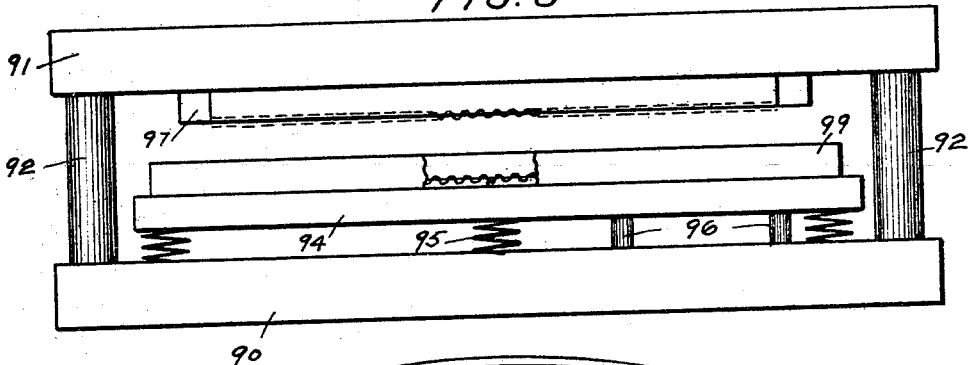
FIG. 8
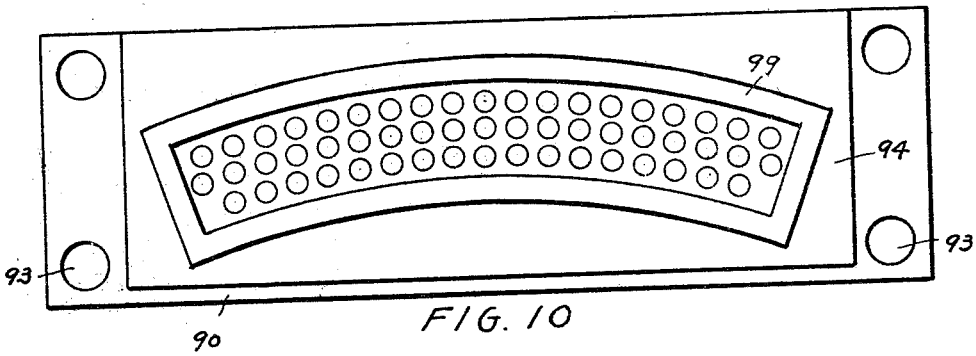
FIG. 11
FIG. 10
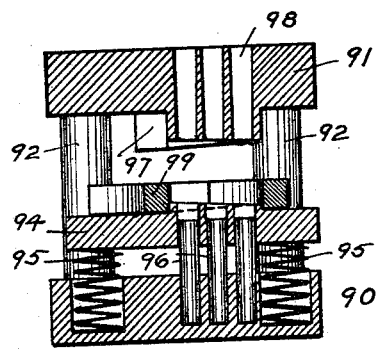
FIG. 9
Witnesses
Nettie Sider.
Joseph A. Wortman.
Inventor
Charles A. Eligh,
By Kerr, Page, Cooper & Hayward,
Attorneys

UNITED STATES PATENT OFFICE.

CHARLES A. ELIGH, OF DETROIT, MICHIGAN, ASSIGNOR TO LONG MANUFACTURING COMPANY, OF DETROIT, MICHIGAN, A CORPORATION OF MICHIGAN.

METHOD OF MAKING HEAT-RADIATING FINS.

1,257,201.        Specification of Letters Patent.        Patented Feb. 19, 1918.

Application filed August 13, 1915. Serial No. 45,285.

*To all whom it may concern:*

Be it known that I, CHARLES A. ELIGH, a citizen of the United States, residing at Detroit, Wayne county, Michigan, have invented a new and useful Method of Making Heat-Radiating Fins, of which the following is a full, clear, and exact description.

The present application is related to my application, Serial No. 17852, in which I showed and claimed a corrugated fin for radiators. In the present application I disclose and claim a method of making the fin.

For various reasons, mentioned in said application, the fins are made out of straight strips of sheet metal, and it is desirable, though not essential, that the edges of the strips be strengthened, which is preferably done by folding them over and reinforcing one edge by a wire confined in the fold. Briefly the method of making the fins is as follows: The metal, in a roll, is mounted on a machine which automatically folds the edges, places a wire in one of the folds and cuts the metal off in pieces of the required length. These pieces are then passed between corrugating rollers. The corrugations are deepest at the edge which is not wired and their depth gradually diminishes until they disappear at the wired edge. This produces a curvature in the strip in its own plane. The strip is then put into a die having a face with corrugations complementary to its own and perforated. The strip is held against this perforated face while being perforated and is thus protected from distortion under the action of the perforating punches.

In the accompanying drawings,

Fig. 6 is a plan view of the corrugating machine.

Fig. 7 is an elevation of the corrugating machine.

Fig. 7<sup>A</sup> is a fragmental sectional view showing the relative position of the portion of the corrugating rolls which corrugates the unwired edge of the fin, the portion of the fin where the corrugations are deepest.

Fig. 7<sup>B</sup> is a fragmental view showing the relative position of the ends of the corrugating rolls adjacent to the wired edges of the strip, where the corrugations are required to die out.

Fig. 8 is an elevation of the perforating die.

Fig. 9 is a transverse section of the perforating die.

Fig. 10 is a plan of the lower portion of the perforating die.

Fig. 11 is the finished fin.

Figure 1:
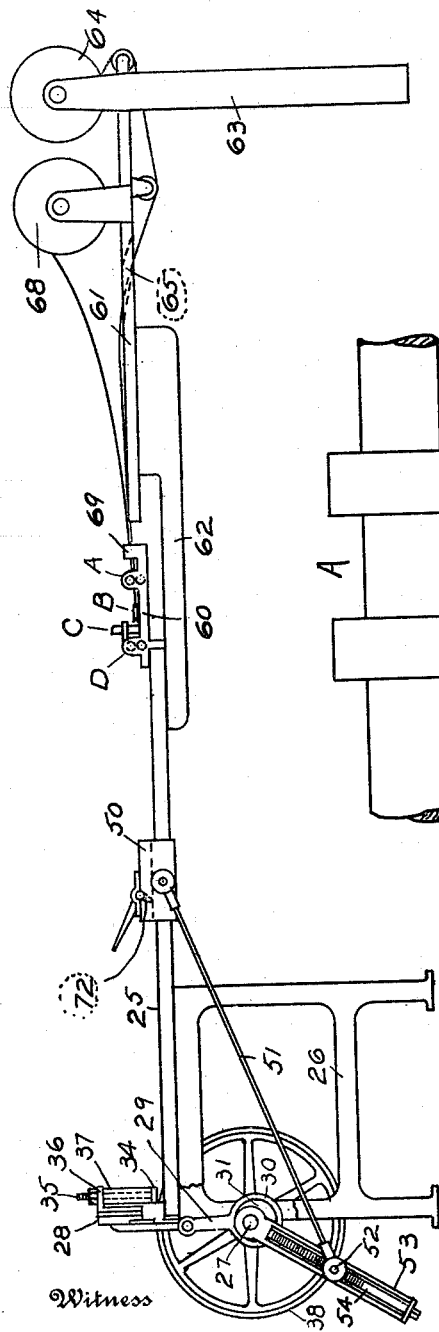
Figure 1 is an elevation of the machine for preparing the edges of the metal and cutting it into lengths.

Referring to Fig. 1, a bed 25 is supported by a frame 26 carrying a revoluble shaft 27. At the end of the bed the frame extends above the bed and forms guides for a reciprocating head 28 which is connected by pitmen 29 to eccentric straps 30 surrounding eccentrics 31 rigidly secured to shaft 27. A stationary shear blade 32 is secured to the end of the bed, and the head carries the companion shear blade 33. A clamping plate 34 carried on the lower ends of a pair of rods 35 is arranged to press down on the bed during a certain part of each revolution of the shaft 27. The rods pass through a flange 36 projecting from the head, and springs 37, preferably rubber, are confined between the clamping plate and said flange. The shaft is rotated by a belt on the pulley 38. A gripper 50 is mounted to slide on the bed 25 and is connected by a pitman 51 to a wrist pin 52. The wrist pin is carried by a block arranged to slide on an arm 53, a screw 54 enabling the block to be set and held at various distances from the shaft on which the arm is carried. By this means the gripper is moved to and fro on the bed.

Figure 2:
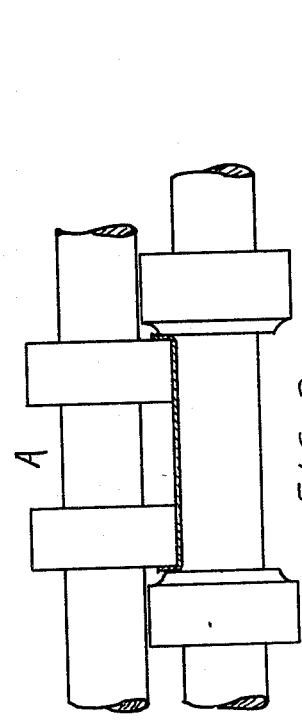
Fig. 2 is a detail showing the rollers located at A whereby the first operation is performed on the edge.
Figure 5:
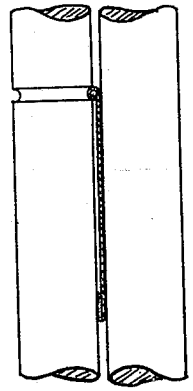
Fig. 5 shows the rollers seen at D, Fig. 1, for finishing the edges.
Figure 4:
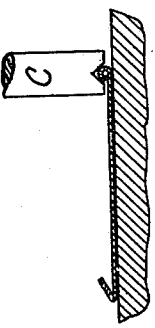
Fig. 4 is a tool located at C, Fig. 1, arranged to press the free edge of the fold down around the wire.
Figure 3:
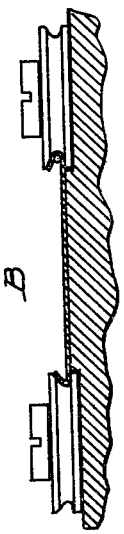
Fig. 3 shows rollers located at B, Fig. 1, which perform the second operation, the wire meanwhile having entered one of the folds.

At the other end of the bed a number of forming devices are mounted in a frame 60, and beyond this is a sort of table 61, one end of which is supported by an arm 62 extending from the bed, the other end being supported by a leg 63. A reel 64 carrying a roll of sheet metal is mounted at the end of this table, and after passing around a pair of rollers and under the table the metal from this reel passes up through a slit 65 in the table and to the forming devices in frame 60. The first of these devices is shown at A and consists of a pair of rollers (Fig. 2) which turns both ends of the metal up. The next of the devices, shown at B (Fig. 3) is a pair of rollers, acting independently, each of which turns one edge farther over. At this point a wire taken from a reel 68 at the end of the table and passed through a guide 69, is laid under one overturned edge, as is clearly seen in Fig. 3. Next beyond this the edge containing the wire passes beneath a stationary bar C having a V-shaped groove in its lower edge (see Fig. 4), which turns the edge down around the wire. The metal next passes between rollers D (Fig. 5) which roll the metal closely around the wire and roll the other edge down flat. Having passed through the several forming devices whereby its edges are prepared, the metal passes through the gripper to the shears. The gripper has a spring pressed gripping pawl 72, below which the metal passes and it is pressed by the gripping pawl against the bottom of the gripper. The pawl is placed at such an angle with reference to the metal that when the gripper moves toward the head 28 friction, assisted by the pawl spring, tends to swing the pawl downward and grip the metal. By this means the metal is pulled through the several forming devices.

The cams 31 are so set on the shaft with reference to the arm 53 that the clamping plate 34 is brought down on the metal just as the pitman 51 passes over the center with the gripper at the head end of its stroke. The rubber springs 37 yield and allow the head to continue moving downward which eventually brings the blade 33 down and shears off the metal. The gripper is meanwhile moving away from the head and because of the angularity of the gripping pawl and the fact that the metal is clamped on the bed by plate 34 the metal slips through the gripper. The cams are so timed that the plate 34 is lifted from the metal just as the pitman goes over the center at the end of the rearward stroke of the gripper, so that as the gripper returns it may carry the metal with it. It is evident from the foregoing that the operation is automatic and that the prepared metal is cut to uniform lengths. The particular form preparation of the edges takes is immaterial, and since the devices described are somewhat similar to those well known in the art it is evident that considerable variation in the treatment of the metal is possible. Moreover, the metal may, if desired, be cut to lengths without any operation on its edges.

The prepared strips are corrugated in the machine shown in Figs. 6 and 7 in which a pair of corrugated rolls, 80 and 81, are mounted to rotate between uprights 82, a belt on pulley 83 driving the rolls whose corrugations enmesh like gear teeth. Roll 80 rotates in bearings formed in the uprights 82, while roll 81 rotates in bearings (not shown) arranged to slide up and down in guides formed in said uprights. Springs (not shown) press the bearings upward and each bearing may be pressed down in opposition to its spring by a screw 84. This is a well known construction and it is sufficient to say that the upper roll may be so adjusted with reference to the lower one that the corrugations formed in the strips will be deepest at one edge, the depth gradually diminishing until the corrugations disappear at the other edge. This produces a curvature in the strip in its own plane. The metal lies on a bed 85 and the wired edge passes through a tubular guide 86, a roller 87 holding the remainder of the strip down to the bed. By means of the screws 84 the machine can be adjusted so as to impart any desired curvature to the strips. This will be understood by reference to Figs. 7$^A$ and 7$^B$. In the latter figure the fin is represented by a straight line, this being the portion of the fin contiguous to the wired edge. At this point the rolls are separated so as not to corrugate the fin. In Fig. 7$^A$ the fin is shown with corrugations nearly as deep as those of the rolls, this representing the unwired edge of the fin. The depth of enmeshment of the rolls may be varied so as to increase or diminish the depth of the corrugations imparted to this edge of the fin, and it is clear that the deeper the corrugations in the fin are made the shorter will the unwired edge become and the greater will be the curvature of the fin.

The strips are next perforated in the die shown in Figs. 8, 9 and 10. This die comprises a base 90 and top 91, the latter having guide pins 92 which slide in the base. Above the base a stripper plate 94 is supported by springs 95. Punches 96 set in the base extend up into holes in the stripper plate. The female portion of the die, 97, is secured to the under side of the top and has holes 98 into which the punches enter, the edges of the holes and corners of the punches acting as shears. The die has the form of the corrugated strip and its surface has corrugations complementary to those of the fin. The stripper plate has also the form of the corrugated strip and is bounded by a frame 99 which acts as a guide for locating the strip. The surface of the stripper also has corrugations complementary to those of the strip. The die is placed in an ordinary punch press and in operation the strips are laid on the stripper. When the press comes down it presses the die down on the strip, which is therefore clamped between the two corrugated surfaces. Continuing downward the press forces the stripper downward in opposition to the springs and forces the punches through the strip, shearing out pieces the shape of the punches, these pieces, called slugs, passing up into the holes 98. Corrugations on the stripper are not essential though they are preferable. The surface may be level, and, if desired pointed pins may be placed in suitable positions to act as a sort of substitute for corrugations. Corrugating the face of the die, however, serves to protect the strip from distortion by the punches, and corrugations on the stripper assist in this protection. As the press rises the springs force the stripper plate upward, thus lifting the strip, which is now a finished fin, off of the punches.

Having described the machines for performing the several operations, what I claim is as follows:

1. The herein described method of making heat radiating fins, which consists in corrugating a flat strip of metal in such a manner as to impart curvature to the strip in its own plane, then punching apertures in the strip, holding and supporting the strip while the punches travel from the top to the bottom of the corrugations, in such manner as to prevent the deformation of the corrugations.

2. The herein described method of making heat radiating fins which consists in corrugating a flat strip of metal with corrugations which begin at one side of the strip and gradually die out as they approach the other side of the strip, and in corrugating forming said corrugations in such manner as to impart a predetermined and uniform curvature to the strip in its own plane, and thereafter perforating the strip, holding and supporting the strip while the punches travel from the top to the bottom of the corrugations, in such manner as to prevent deformation of the corrugations.

3. The herein described method of making heat radiating fins, which consists in first strengthening two parallel edges of a strip, then cutting off the strip to the desired length, then deforming the strip with corrugations which are deep at one edge and diminish in depth as they approach the opposite edge to shorten the edge of the strip having deep corrugations and thereby curve the strip and maintain it in its own plane, and thereafter perforating the strip.

4. A method of making fins for radiators, comprising strengthening of the edges of the strips of metal, corrugating of said prepared strips in such a manner as to impart curvature thereto in their own planes, subsequently perforating the strips, and supporting said strips to prevent deformation of the corrugations while they are being perforated.

5. The herein described method of making heat radiating fins which consists in corrugating a flat strip of metal with corrugations which begin at one edge of the strip and gradually die out as they approach the other edge, thereby shortening one edge and to a gradually diminishing extent the intermediate portions of the strip, and in corrugating forming said corrugations so as to produce a predetermined and uniform curvature of the strip in its own plane without stretching the metal thereof, and thereafter perforating the strip with perforations which are indiscriminately located with respect to the corrugations, holding and supporting the strip while perforating it, so as to preserve the curvature.

6. The herein described method of making heat radiating fins which consists in first shaping the edges of a flat strip of metal and concurrently wiring one edge thereof, thereafter corrugating the strip with corrugations which are deepest at the unwired edge and gradually diminishing in depth as they approach the wired edge, thereby shortening the unwired edge and to a gradually diminishing extent the intermediate portions of the strip, so as to produce curvature of the strip in its own plane, and thereafter perforating the strip.

In testimony whereof I affix my signature in the presence of two subscribing witnesses.

CHARLES A. ELIGH.

Witnesses:
J. L. DRYDEN,
J. VERNON KEMP.

Copies of this patent may be obtained for five cents each, by addressing the "Commissioner of Patents, Washington, D. C."